United States Patent
Bastide et al.

(10) Patent No.: US 9,665,558 B2
(45) Date of Patent: *May 30, 2017

(54) METHOD FOR MAINTAINING CONVERSATIONAL CADENCE IN ONLINE SOCIAL RELATIONSHIP OR NETWORK, INVOLVES PROVIDING SET OF FILL-IN MESSAGES THAT CREATE APPEARANCE TO ANOTHER IN SOCIAL NETWORK OF NO REDUCTION IN CONVERSATIONAL CADENCE

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,719

(22) Filed: Mar. 18, 2015

(65) Prior Publication Data
US 2015/0341305 A1 Nov. 26, 2015

Related U.S. Application Data

(63) Continuation of application No. 14/286,378, filed on May 23, 2014.

(51) Int. Cl.
*G06F 17/27* (2006.01)
*H04L 12/58* (2006.01)
*G06F 17/28* (2006.01)

(52) U.S. Cl.
CPC .............. *G06F 17/27* (2013.01); *G06F 17/28* (2013.01); *H04L 51/02* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 7,953,814 | B1 * | 5/2011 | Chasin | H04L 12/585 709/207 |
| 2011/0154224 | A1 * | 6/2011 | Bates | G06Q 10/10 715/758 |

(Continued)

FOREIGN PATENT DOCUMENTS

IN 1786/DEL/2011 A 10/2013

OTHER PUBLICATIONS

International Business Machines Corporation, "List of IBM Patents or Patent Applications Treated as Related," submitted Mar. 25, 2015, 2 pages.

(Continued)

*Primary Examiner* — Vincent Rudolph
*Assistant Examiner* — Richa Mishra
(74) *Attorney, Agent, or Firm* — Charles L. Moore; Moore & Van Allen PLLC (57) ABSTRACT

A method for maintaining conversational cadence may include determining, by a processor, a conversational cadence associated with a user in a social network. The conversational cadence may be determined based on a plurality of messages previously transmitted by the user. The method may also include detecting, by the processor, a reduction in the conversational cadence of the user. The method may further include providing, by the processor, a set of fill-in messages that create an appearance to another (Continued)

user in the social network that there is no reduction in the conversational cadence.

13 Claims, 3 Drawing Sheets

(56) References Cited

U.S. PATENT DOCUMENTS

| | | | | |
|---|---|---|---|---|
| 2012/0030586 A1* | 2/2012 | Ketkar | ............... | G06F 17/3089 715/751 |
| 2012/0297368 A1* | 11/2012 | Bingell | ................... | H04L 12/54 717/126 |
| 2013/0013713 A1* | 1/2013 | Shoham | ............ | G06Q 30/0283 709/206 |

OTHER PUBLICATIONS

IBM. "Semi-Automatic Email Generation for Maintaining Social Network". IP.com, IPCOM0001830490, May 13, 2009. pp. 1-4.

IBM. "SPSS Text Analytics for Surveys," downloaded from <http://www-03.ibm.com/software/products/en/spsa-text-analytics-surveys> on Apr. 21, 2014, pp. 1-2.

IBM. "SPSS Statistics," downloaded from <http://www-01.ibm.com/software/analytics/spss/products/statistics/> on Apr. 21, 2014, pp. 1-2.

Wikipedia, "Natural Language Processing," downloaded from <http://en.wikipedia.org/wiki/Natural_language_processing> on Apr. 21, 2014, pp. 1-10.

* cited by examiner

METHOD FOR MAINTAINING CONVERSATIONAL CADENCE IN ONLINE SOCIAL RELATIONSHIP OR NETWORK, INVOLVES PROVIDING SET OF FILL-IN MESSAGES THAT CREATE APPEARANCE TO ANOTHER IN SOCIAL NETWORK OF NO REDUCTION IN CONVERSATIONAL CADENCE

CROSS-REFERENCE TO RELATED APPLICATIONS

This application is a continuation application of U.S. patent application Ser. No. 14/286,378, filed May 23, 2014, the contents of which are incorporated herein by reference in its entirety.

BACKGROUND

Aspects of the present invention relate to social networks, and more particularly to a method, system and computer program product for maintaining conversational cadence in an online social relationship or network.

Online social networks are a universal mechanism to connect people and information in logical and organized ways which enable sharing and processing of information between the members of the social network. Common mechanisms for sharing and processing information on online social networks may include, but is not necessarily limited to, a wall or virtual wall where users or member of the social network can post messages for other users or members; an activity stream which may be a list of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network. These mechanisms also enable users or members to establish and maintain relationships. A cadence, rhythm or systematic flow of communications may be developed between users to maximize the relationship. When a user or group of users are unable to communicate for one reason or another, the cadence may be lost and the relationship may degrade. Accordingly, there is a need for maintaining a conversational cadence between users or participants in a social network.

BRIEF SUMMARY

According to one aspect of the present invention, a method for maintaining conversational cadence may include determining, by a processor, a conversational cadence associated with a user in a social network. The conversational cadence may be determined based on a plurality of messages previously transmitted by the user. The method may also include detecting, by the processor, a reduction in the conversational cadence of the user. The method may further include providing, by the processor, a set of fill-in messages that create an appearance to another user in the social network that there is no reduction in the conversational cadence.

According to another aspect of the present invention, a system for maintaining conversational cadence may include a processor and a social networking module operating on the processor. The social networking module may include a conversational cadence module. The conversational cadence module may be configured to perform a set of functions including determining a conversational cadence associated with a user in a social network. The conversational cadence may be determined based on a plurality of messages previously transmitted by the user. The set of functions may also include detecting a reduction in the conversational cadence of the user. The set of functions may additionally include providing, a set of fill-in messages that create an appearance to another user in the social network of no reduction in the conversational cadence.

According to another aspect of the present invention, a computer program product for maintaining conversational cadence may include a computer readable storage medium having program instructions embodied therewith. The program instructions being executable by a device to cause the device to perform a method that may include determining a conversational cadence associated with a user in a social network. The conversational cadence may be determined based on a plurality of messages previously transmitted by the user. The method may also include detecting a reduction in the conversational cadence of the user. The method may additionally include providing a set of fill-in messages that create an appearance to another user in the social network of no reduction in the conversational cadence.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be corrected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1A:
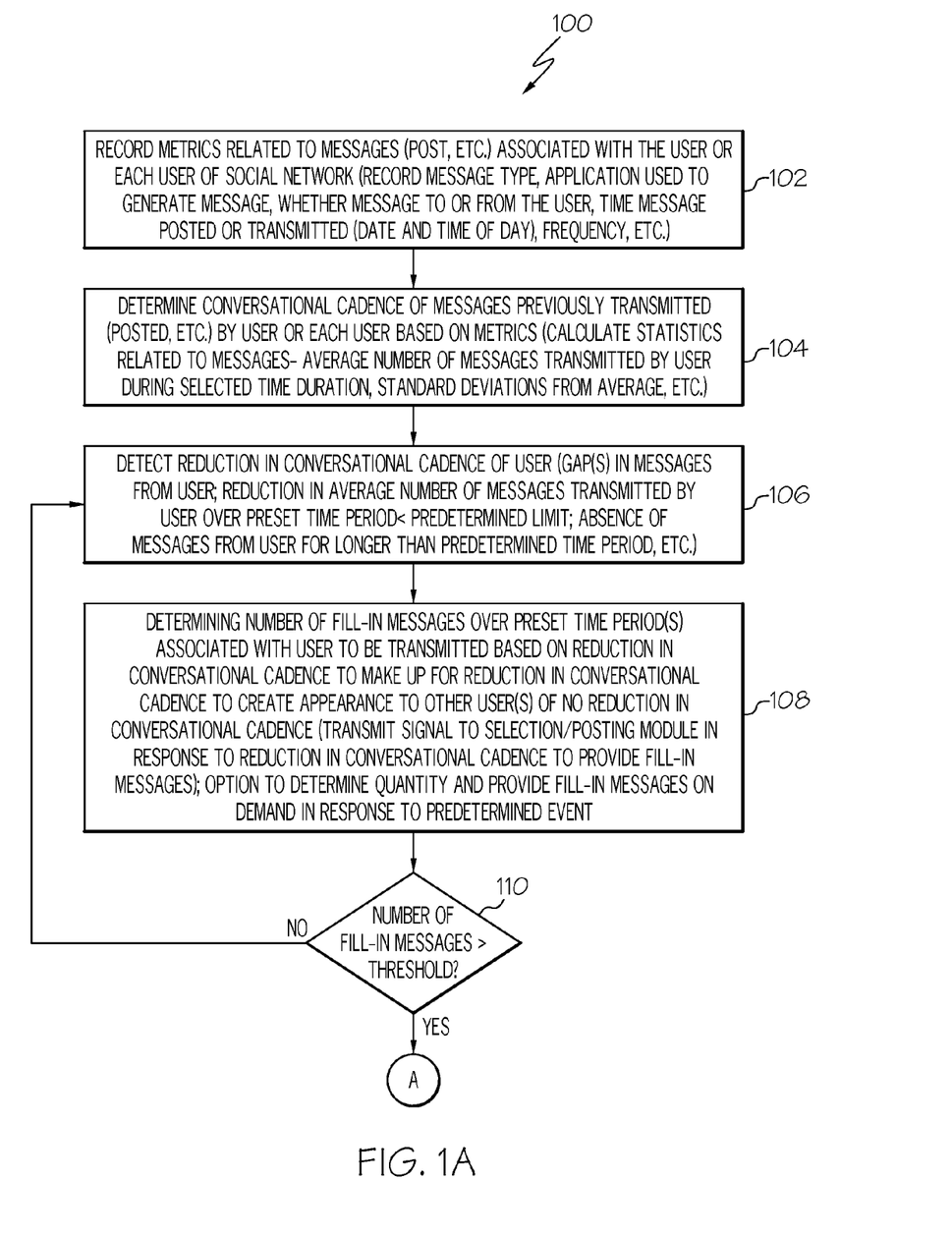
FIGS. 1A and 1B (collectively FIG. 1) is a flow chart of an example of a method for maintaining conversational cadence in an online social relationship in accordance with an embodiment of the present invention.
Figure 1B:
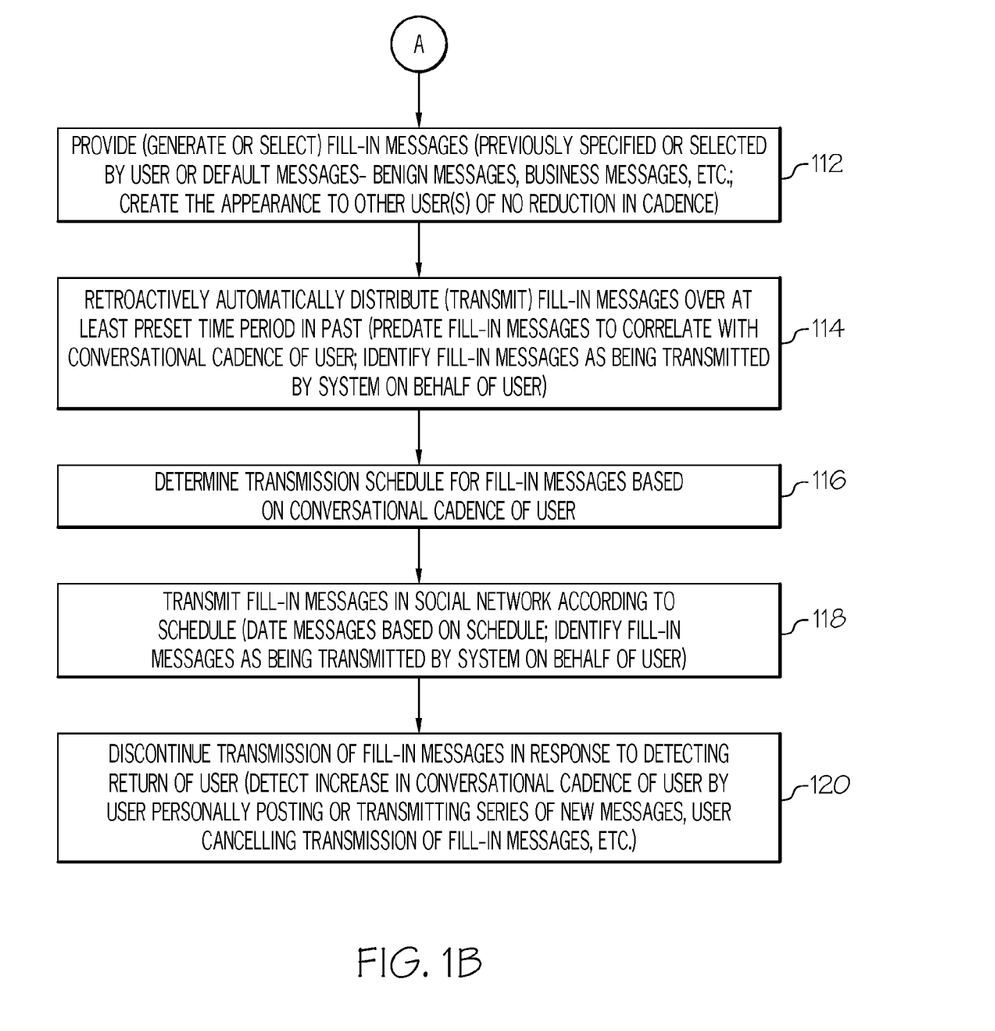

FIGS. 1A and 1B (collectively FIG. 1) are a flow chart of an example of a method 100 for maintaining conversational cadence in an online social relationship or network in accordance with an embodiment of the present invention. In block 102, metrics related to a multiplicity of messages associated with a user or each user or participant in an online communications network, such as a social network or other network, may be recorded. As used herein, a message may refer to any type of communications by a user or participant in an online social network or other network using any type of communications application operating on any type of communications device. For example, a message may be a post in an activity stream including a series of posts or communications between users or participants in an online social network. Examples of online social networks which may enable activity streams may include but is not necessarily limited to MySpace, Facebook, IBM Connections, and LinkedIn. MySpace is a trademark in the United States, other countries or both of MySpace LLC. Facebook is a trademark in the United States, other countries or both of Facebook, Inc. IBM Connections is a trademark in the United States, other countries or both of International Business Machines Corporation. LinkedIn is a trademark in the United States, other countries or both of LinkedIn Ltd.

Examples of metrics related to messages which may be recorded may include but is not necessarily limited to a message type, the application used to generate or transmit the message, whether the message is to or from the user, a timestamp or date and time of day the message was posted or transmitted, a frequency, average frequency or mean frequency of transmission of messages by a particular user and any other data or information that may be useful in determining a conversational cadence of a user or participant in an online social network and detecting any change or reduction in the conversational cadence of the user.

In block 104, a conversational cadence associated with the user or each user or participant in the online social network may be determined based on a plurality of messages previously transmitted by the user or each user utilizing at least some the recorded metrics. As used herein, transmitting a message may also refer to posting a message or any form of conveyance of messages to other users or participants in a network. The conversational cadence may be determined by calculating statistics related to the messages transmitted by a particular user or participant. For example, an average number of messages transmitted by a user during a selected time duration and a standard deviation from the average may be calculated for determining the conversational cadence of the user. The selected time duration may be an hour, a selected number of hours, a day, a week or other specified time duration. The conversational cadence may correlate to at least the average number of messages transmitted by the user during the selected time duration.

In accordance with other embodiments, the conversational cadence may be determined based on an average for an entire system or network, on a per user basis, based or a group or set of users within a social network, by setting a threshold number of messages that each user may be expected to transmit or post over a chosen time duration, for example 20 messages per day, or by any other technique that may permit detection of a reduction in the conversational cadence.

Determining the conversational cadence based on an average for an entire system or network may include aggregating the number of messages sent within the system or network and averaging the number of messages over a set time window, e.g., a 24 hour period, for each user or member. The conversational cadence may then be calculated as the average number of messages per user per the set time window or period.

Determining the conversational cadence on a per user basis may include aggregating the number of messages set by the user and determining an average of the aggregate number of messages per a set time window or period. The conversational cadence may then correlate or correspond to the average number of messages per the set time window.

Determining the conversational cadence for a group or set of users may include aggregating the number of messages for the group and averaging over the set time window. The conversational cadence may then be determined as the average number of messages per user per time window.

Once a baseline conversational cadence is established, the baseline can be compared against a single user's number of messages in a most recent time window. Generally, the number compared to is calculated over a larger time window. For determining a standard deviation, the number of messages sent on a system basis, per user basis or group basis during a set time window may be aggregated similar to that described above. The standard deviation may then be calculated in the usual as is commonly known.

In block 106, a reduction in the conversational cadence of the user may be detected. As described in more detail herein, a cadence determination and monitoring module operating on a processor or computing device may be configured to determine the conversational cadence associated with the user and may monitor activity of the user to detect the reduction in the conversational cadence. Examples of ways of detecting the reduction in the conversational cadence may include but is not necessarily limited to: detecting a gap of time or gaps of time between messages from the user longer than a preset time limit; a reduction in the average number of messages transmitted by the user over a preset time period, for example, the reduction in the average number of messages transmitted by the user over the preset time period being less than a predetermined limit or threshold; an absence of messages from the user for longer than a predetermined time period, or any other indication of a reduction in the conversational cadence associated with the user. The time window over which the number of messages may be monitored for determining a reduction in conversational cadence may be set by the user or administrator for the system or organization. As an example, a reduction in the conversational cadence corresponding to a decrease in the average number of messages transmitted by the user over the preset time period by two standard deviations may correspond to a sufficient reduction in conversational cadence of the user to trigger providing fill-in messages as described herein to create the appearance of no reduction in the conversational cadence to other users or participants in the social network.

In block 108, a number or quantity of fill-in messages over the preset time period or preset time periods may be determined to make up for the reduction in the conversational cadence or gap in messages and to create the appearance to the other user or users of no reduction in the conversational cadence of the user. A signal may be transmitted to a fill-in message selection and posting module in response to detecting the reduction in the conversational cadence of the user for the preset limit or threshold. The fill-in message selection and posting module will provide the messages based on the number needed to fill-in the gap in response to the signal.

In accordance with an embodiment, an option may be provided to determine the quantity of fill-in messages and to provide the messages on demand in response to detecting the reduction in the conversational cadence of the user and a predetermined event. An example of the predetermined event may include another user contacting the user associated with the reduction in the conversational cadence or some other event that may call for providing the fill-in messages. For instance, a user may navigate to a profile of a particular user that may have a reduced conversational cadence because the particular user has been unable for some reason to participate in the social network. If no change has occurred to the particular user's profile, fill-in messages may then be provided to the social network to create the appearance that there is no reduction in the conversational cadence of the particular user and thereby maintain the ongoing relationship between the users.

In block 110, a determination may be made if the number or quantity of fill-in messages exceeds a predetermined threshold. If the determination is made that the number or quantity of fill-in messages does not exceed the predetermined threshold, the method 100 may return to block 106 and the method 100 may continue similar to that previously described. If the number of fill-in messages exceeds the threshold, the method 100 may advance to block 112. This feature provides a threshold for not providing fill-in messages if the number of fill-in messages would be insignificant. For example, providing a limited number of fill-in messages, e.g., one or two may not even be noticed by other users, whereas a much larger number of fill-in messages would have an impact in maintaining the conversational cadence and the social relationships. Accordingly, the fill-in messages would not be provided unless or until the number of fill-in messages determined in block 108 exceeds the threshold.

In block 112, a set of fill-in messages may be provided to create the appearance to other users of no reduction in conversational cadence of the user. A type of fill-in messages may be previously specified or selected by the user or default messages may be generated or selected by the system or method 100 in the event the user has not previously specified or selected a type of fill-in messages to be provided. The types of fill-in messages may be benign-type fill-in messages, business-type fill-in messages or other types or categories of messages that may facilitate the ongoing relationship between the user and other users of the social network. Examples of benign-type fill-in messages may include but is not necessarily limited to weather reports in a geographic location where the user may be traveling as determined based on a last message or post from the user, airline flight information based on a travel itinerary of the user, photographs or images of a geographic location where the user may be located or traveling (these may be previously loaded by the user or the system may perform a network search to retrieve the photographs or images), emoticons illustrating a last state of the user, stock prices associated with a particular company, or other information based on the previous relationship between the user and other users in the social network, such as a previous course of communications between the users, the subject matter of the communications, etc. between the users. The type of fill-in messages are selected to facilitate maintaining the conversational cadence of the user with other users in the social network.

Examples of business-type fill-in messages may include but is not necessarily limited to messages indicating that the user is meeting with a client based on detecting that the user is at the client's location, messages derived from previous messages with updates, such as working on project X.

In block 114, the set of fill-in messages or portion of the set of fill-in messages may be retroactively automatically distributed over at least an earlier preset time period that corresponds to the reduction in the conversational cadence of the user. The set of fill-in messages may be distributed based on the conversational cadence of the user to create the appearance to other users or participants that there is no reduction in the conversational cadence of the user. The fill-in messages may be predated to correlate with the conversational cadence associated with the user. Accordingly, the fill-in messages may indicate a time separation that correlates with the user's conversational cadence which was determined in block 104 or which correlates with the user's usual or customary frequency of transmitting messages. The fill-in messages may also, optionally, be identified as being transmitted by a system or machine on the half of the user. For example, each fill-in message may include an indication or obvious notification stating that the fill-in message was provided by a system or machine and not the actual user.

In block 116, a schedule for transmission of the set of fill-in messages or another portion of the set of messages that have not been retroactively distributed over an earlier time period may be determined based on the conversational cadence of the user determined in block 104. In block 118, the set of fill-in messages or other portion of the set of messages not retroactively distributed may be transmitted in the social network according to the schedule. The fill-in messages may be dated based on the schedule and the fill-in messages may, optionally, identify that the messages as being transmitted by the system or machine on behalf of the user.

In block 120, transmission of the fill-in messages may be discontinued in response to detecting the return of the user to the social network or detecting another action. Detecting the return of the user to the social network may include detecting an increase in the conversational cadence of the user by the user personally posting or transmitting a series of new messages. Discontinuing transmission of the fill-in messages by another action may include receiving a command from the user or a system administrator to cancel transmission of the fill-in messages.

The method 100 or system running the method 100, such as conversational cadence module 212 described with reference to FIG. 2 may be enabled or disabled by the user. For example, a graphical user interface may be presented to the user to select whether to enable or disable operation of the method 100. In accordance with an embodiment, a graphical user interface may be presented to the user for configuring the method 100 to operate under certain conditions and/or at certain times that may be specified by the user. The method 100 may also be configured by the user to operate only with respect to certain other users or participants in the social network or a certain category of user or participant, such as users in the same organization of group specified by the user.

Figure 2:
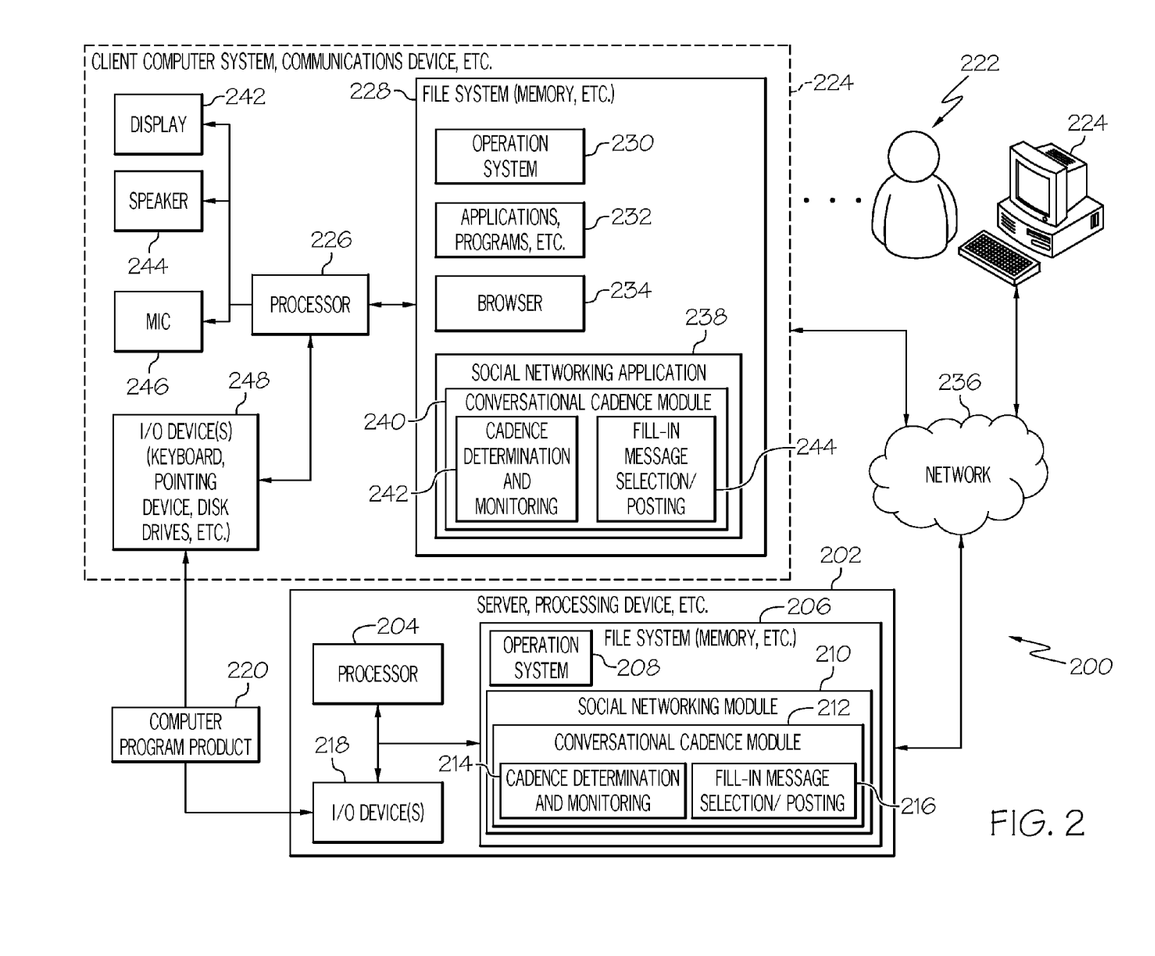
FIG. 2 is a block schematic diagram of an example of a system configured for maintaining conversational cadence in an online social relationship in accordance with an embodiment of the present invention.

FIG. 2 is a block schematic diagram of an example of a system 200 configured for maintaining conversational cadence in an online social relationship in accordance with an embodiment of the present invention. The method 100 of FIGS. 1A-1B may be embodied in and performed by the system 200. The system 200 may include a processing device 202. The processing device 202 may be a server or similar processing device. The processing device 202 may include a processor 204 for controlling operation of the processing device 202 and for performing functions, such as those described herein with respect to maintaining the conversational cadence of a user in an online social network. The processing device 202 may also include a file system 206 or memory. An operating system 308, applications and other programs may be stored on the file system 206 for running or operating on the processor 304. A social networking module 210 or system may also be stored on the file system 206 and may be compiled and run on the processor 204 to perform the functions for organizing messages of a social network similar to that described herein. The method 100 of FIGS. 1A-1B may be embodied in the social networking module 210 and performed by the processor 204 when the social networking module 210 is compiled and run on the processor 204.

The social networking module 210 may include a conversational cadence module 212 for maintaining the conversational cadence of user in an online social network or network as described herein. In another embodiment, the conversational cadence module 212 may be a separate component from the social networking module 210 and operate in coordination with the social networking module 210 to perform the operations described herein.

The conversational cadence module 212 may include a cadence determination and monitoring module 214 and a message selection and posting module 216. The cadence determination and monitoring module 214 may be configured to determine the conversational cadence of a user based on previous messages transmitted by the user similar to that described with reference to block 104 in FIG. 1A. The cadence determination and monitoring module 214 may also be configured to detect a reduction in the conversational cadence of the user similar to that described with reference to block 106 in FIG. 1A. The cadence determination and monitoring module 214 may further be configured to transmit a signal to the fill-in message selection and posting module 216. The fill-in message selection and posting module 216 may be configured to determine the number of fill-in messages over a preset time period based on the conversational cadence of the user and may provide the fill-in messages to create an appearance to other users in the social network that there is no reduction in conversational cadence of the user similar to that described with reference to blocks 108-120 of FIGS. 1A-1B.

The cadence determination and monitoring module 214 may also be configured to continuously monitor the activity of the users in the online social network. The cadence determination and monitoring module 214 may adjust or reset the conversational cadence of a user in response to determining that the conversational cadence of the user has changed by either increasing or decreasing over a certain time period during which the system or social networking module 210 confirms that the user is active and personally generating and transmitting messages in the social network.

The processing device 202 may also include one or more input devices, output devices or combination input/output devices, collectively I/O devices 218 in FIG. 2. The I/O devices 218 may include, but are not necessarily limited to, a keyboard or keypad, pointing device, such as a mouse, disk drive and any other devices to permit a user to interface with and control operation of the processing device 202 and to access the social networking module 210 or system. At least one of the I/O devices 218 may be a device to read a computer program product, such as computer program product 220. The computer program product 220 may be similar to that described in more detail herein. The social networking module 210 may be loaded on the file system 206 from a computer program product, such as computer program product 220.

A member of a social network or user 222 of the system 200 for social networking may use a computer system 224 or communications device to access the processing device 202 or server and social networking module 210 or system. The computer system 224 or communications device may be any sort of communications device including a mobile or handheld computer or communications device. The computer system 224 may include a processor 226 to control operation of the computer system 224 and a file system 228, memory or similar data storage device. An operating system 230, applications 232 and other programs may be stored on the file system 228 for running or operating on the processor 226. A web or Internet browser 234 may also be stored on the file system 228 for accessing the processing device 202 or server via a network 236. The network 236 may be the Internet, an intranet or other private or proprietary network.

In accordance with an embodiment, a social networking application 238, feature or module may also be stored on the file system 228 and operate on the processor 226 of the user's computer system 224. The social networking application 238 may include a conversational cadence module 240 for maintaining a conversational cadence of a user in response to detecting a reduction in the conversation cadence of the user similar to that described herein. In another embodiment, the conversational cadence module 240 may be a separate module from the social networking application 238 and operate in cooperation with the social networking application 238 to perform the functions described herein. The social networking application 238 operating on the computer system 226 may interface with or operate in conjunction with the social networking module 210 or system on the processing device 202 or server to perform the functions and operations described herein for maintaining the conversational cadence of a user or each user. Accordingly, conversational cadence module 238 operating on the computer system 224 may perform some of the functions and operations of the method 100 and conversational cadence module 212 operating on the server 202 may perform other functions of the method 100. Some embodiments of the present invention may include only the social networking module 310 and conversational cadence module 212 on the processing device 202 or server, and other embodiments may include only the social networking application 238 and the conversational cadence module 240 on the client computer system 224 or communications device.

The conversational cadence module 240 may also include a cadence determination and monitoring module 242 and fill-in message selection and posting module 244. The cadence determination and monitoring module 242 and fill-in message selection and posting module 244 may perform functions similar to cadence determination and monitoring module 214 and fill-in message selection and posting module 216 on processing device 202.

The computer system 224 may also include a display 242, a speaker system 244, and a microphone 246 for voice communications. One or more user interfaces may be presented on the display 242 for controlling operating the social networking module 210, social networking application 238 and conversational cadence modules 212 and 240 for performing the operations and functions described herein.

The computer system 224 may also include one or more input devices, output devices or combination input/output, devices, collectively I/O devices 248. The I/O devices 248 may include a keyboard or keypad, pointing device, such as a mouse, disk drives and any other devices to permit a user, such as user 222, to interface with and control operation of the computer system 224 and to access the social networking application 238 and social networking module or system 210 on server 302. The I/O devices 248 may also include at least one device configured to read computer code from a computer program product, such as computer program product 220.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for maintaining conversational cadence, comprising:
  determining, by a processor, a conversational cadence associated with a user in a social network, wherein the conversational cadence is determined based on a plurality of messages previously transmitted by the user, wherein determining the conversational cadence associated with the user comprises determining an average number of messages transmitted by the user during a selected time duration and a standard deviation from the average number of messages;
  detecting, by the processor, a reduction in the conversational cadence of the user; and
  providing, by the processor, in response to detecting the reduction in the conversational cadence of the user, a set of fill-in messages to a communications device of another user in the social network that creates an appearance to the other user in the social network of no reduction in the conversational cadence, wherein providing the set of fill-in messages comprises retroactively automatically distributing a portion of the set of fill-in messages to the other user over at least an earlier preset time period corresponding to when the reduction in the conversational cadence occurs, wherein the portion of the set of fill-in messages are retroactively automatically distributed over the earlier preset time period that corresponds to the reduction in conversational cadence of the user by automatically predating the set of fill-in messages by the processor to correlate with the conversational cadence associated with the user and each message of the portion of the set of fill-in messages indicating a time separation that correlates to the conversational cadence associated with the user.

2. The method of claim 1, further comprising:
  scheduling transmission of the set of fill-in messages based on the conversational cadence of the user;
  transmitting the set of fill-in messages in the social network according to a schedule based on the conversational cadence of the user to create the appearance of no reduction in the conversational cadence; and
  discontinuing transmission of the set of fill-in messages in response to one of detecting return of the user to the social network or detecting another action.

3. The method of claim 2, wherein detecting return of the user to the social network comprises detecting an increase in the conversational cadence of the user by the user personally transmitting a series of new messages in the social network.

4. The method of claim 2, wherein detecting another action comprises receiving a command from the user to cancel transmission of the set of fill-in messages in the social network.

5. The method of claim 1, further comprising:
  scheduling transmission of another portion of the set of fill-in messages based on the conversational cadence of the user;
  transmitting the other portion of the set of fill-in messages in the social network according to a schedule based on the conversational cadence of the user to create the appearance of no reduction in the conversational cadence; and
  discontinuing transmission of the other portion of the set of fill-in messages in response to one of detecting return of the user to the social network or detecting another action by the user.

6. The method of claim 1, wherein determining the conversational cadence associated with the user comprises recording metrics related to a multiplicity of messages associated with the user.

7. The method of claim 1, wherein detecting the reduction in the conversation cadence of the user comprises at least one of detecting a reduction in the average number of messages transmitted by the user over a preset time period during the selected time duration being less than a predetermined limit and detecting an absence of messages from the user for more than a predetermined time period.

8. The method of claim 1, wherein providing the set of fill-in messages comprises providing the set of fill-in messages in response to detecting the reduction in the conversational cadence of the user and in response to a predetermined event.

9. The method of claim 8, wherein the predetermined event comprises another user contacting the user associated with the reduction in the conversational cadence.

10. The method of claim 1, further comprising identifying the fill-in messages as being provided by a system on behalf of the user.

11. The method of claim 1, further comprising allowing the user to select a type of message for the set of fill-in messages, wherein the type of fill-in messages comprises at least one of benign fill-in messages and business fill-in messages.

12. The method of claim 1, further comprising identifying that the fill-in messages are transmitted by a system or machine on behalf of the user.

13. The method of claim 1, wherein detecting the reduction in the conversational cadence of the user comprises detecting a decrease in the average number of messages transmitted by the user over the selected time duration by two standard deviations.

* * * * *